United States Patent
Robinson et al.

(10) Patent No.: US 7,202,977 B2
(45) Date of Patent: Apr. 10, 2007

(54) METHODS FOR POSITIONING A PRINT INTEGRITY IMAGE CAPTURE DEVICE

(75) Inventors: David C. Robinson, Penfield, NY (US); Michael Axelrod, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 1345 days.

(21) Appl. No.: 09/683,539

(22) Filed: Jan. 16, 2002

(65) Prior Publication Data

US 2003/0133139 A1    Jul. 17, 2003

(51) Int. Cl.
  *G06K 15/00* (2006.01)
(52) U.S. Cl. .................... 358/3.28; 358/1.12; 358/1.18
(58) Field of Classification Search ................ 358/1.9, 358/2.1, 1.18, 1.6, 3.28, 3.23, 1.12
  See application file for complete search history.

(56) References Cited

U.S. PATENT DOCUMENTS

| | | | | |
|---|---|---|---|---|
| 5,682,540 A | * | 10/1997 | Klotz et al. ................. | 715/505 |
| 5,752,446 A | * | 5/1998 | Squibb ........................ | 101/486 |
| 5,850,254 A | * | 12/1998 | Takano et al. .............. | 348/148 |
| 6,230,898 B1 | * | 5/2001 | Duffy ......................... | 209/509 |
| 7,013,029 B2 | * | 3/2006 | Keskar et al. .............. | 382/119 |
| 7,092,116 B2 | * | 8/2006 | Calaway .................... | 358/1.18 |
| 2002/0057463 A1 | * | 5/2002 | Kanazawa .................. | 358/437 |
| 2002/0070281 A1 | * | 6/2002 | Nimura et al. .............. | 235/494 |
| 2002/0075514 A1 | * | 6/2002 | Wright et al. ............... | 358/1.15 |
| 2002/0111960 A1 | * | 8/2002 | Irons et al. ................. | 707/204 |
| 2003/0025951 A1 | * | 2/2003 | Pollard et al. .............. | 358/505 |
| 2003/0133139 A1 | * | 7/2003 | Robinson et al. ........... | 358/1.12 |

FOREIGN PATENT DOCUMENTS

| | | | |
|---|---|---|---|
| JP | 2000112704 | * | 4/2000 |
| WO | WO 01/91007 A1 | * | 11/2001 |

* cited by examiner

*Primary Examiner*—Jerome Grant
(74) *Attorney, Agent, or Firm*—Oliff & Berridge, PLC

(57) ABSTRACT

A method for positioning a print integrity image capture device comprises the steps of creating electronic document data; adding print integrity markings to the electronic document data; sending the electronic document data to a raster image processor; determining the location of integrity markings for a tangible print of electronic document data; automatically adjusting an image capture device location based on integrity marking location information; providing necessary scheduling information to a feeding device and/or a sorting device; printing a tangible print of electronic document data; scanning a tangible print of electronic document data based on a determined image capture location; analyzing an image to determine which integrity marking is located on the tangible print of electronic document data; relaying an integrity marking number to a production management algorithm; determining whether all tangible prints of electronic document data have been printed; and determining whether all documents have been printed.

34 Claims, 6 Drawing Sheets

METHODS FOR POSITIONING A PRINT INTEGRITY IMAGE CAPTURE DEVICE

BACKGROUND OF THE INVENTION

1. Field of Invention

This invention relates to print production processes and positioning print integrity image capture devices based on the locations of print identifiers.

2. Description of Related Art

In current print production processes, when printing certain documents containing variable data, such as financial transactions, it is essential that verification be performed on the printed output document. Typically, a print integrity identifier, such as a bar code or glyph, may be printed on each page of a document. An imaging device, such as a camera or scanner, may then capture the identifier on the printed page. The captured image is fed to a decoding algorithm, which analyzes the image and determines which identifier is present on the page. This information may then be used to determine which pages of a document have or have not been printed within a variable data job. Because a print job may be composed of many individual documents, the information may also be used to determine whether all the documents of a print job have been printed. The information may ultimately be used to determine when a particular job has been completed or whether a particular document has been altered from its original form.

SUMMARY OF THE INVENTION

The location of a print integrity identifier within the printed page or sheet may change location from page to page within a variable data job. For example, in the printing of certain financial transactions, the amount of text may vary from page to page in the document. In this situation, it may not be practical or desirable to place a print integrity identifier, such as a bar code or a glyph, consistently in the same space on the printed page. Instead, the identifier might be variably located to facilitate the optimum placement of text on the given page. In this case, the print integrity image capture device must be physically relocated based on the identifier location on each page. Typically, if the image capture device is a camera, its location must be manually adjusted by the operator for each page. This manual process can be lengthy and time-consuming, thus reducing the productivity of the operator and printing process. Additionally, because the camera location is adjusted manually, there is the possibility of error in positioning the camera in reference to the print integrity identifier. If the camera has not been adequately aligned with the print integrity identifier, complications or errors could result in the system.

Where the imaging device for capturing the identifier on a printed page is a scanner, the image capture location must be adjusted for each page. Because this process is also manual, it can also be time-consuming and is subject to operator error. Further complexities can arise when multiple identifiers occur on each page. The manual process of adjusting the image capture device disrupts the print operator's workflow and also increases set-up time between print jobs. These disruptions and increases in set-up time between print jobs ultimately lead to increased operational costs to a print shop.

This invention provides systems and methods for automatically adjusting the image capture location for each page of a document within a variable data job.

In various exemplary embodiments of the systems and methods of this invention, the location of the print identifier, being defined as a vertical and horizontal area, is determined on a page-by-page basis by an image processor such as a raster image processor (RIP). In various other exemplary embodiments, a print integrity identifier generator within the printing system makes the location information it used to create the print integrity identifier available to down stream processes. In various other exemplary embodiments, an authoring tool generates location information for the pages within the electronic job file. This information is then provided along with the print data.

This location information typically includes various metadata elements describing the variable data identifier type, the name, the value and importantly, the X and Y coordinate values placing the object within a page and describing the object's geographic boundary. For example, a typical print integrity identifier may be rectangular in shape and could require a rectangular area that is slightly larger than the print integrity identifier to be identified for the scanning device that will scan and decode the print integrity identifier.

When the print integrity identifier has been relocated from page to page, information about the location of the print integrity identifier may then be retrieved by a circuit or software application, which adjusts the image capture device's location of interest by mechanically moving one or more cameras that capture a portion of the printed page. These cameras may be moved by servo motors or other such similar mechanical devices. When using a scanner, a circuit or software application would use the location information of the print integrity identifier to adjust the decoding regions for a capture device that captures the full printed page.

In various exemplary embodiments, the circuit or software application may also feed any required scheduling information to the device feeding the page across the capture device. For instance, in the case of a print station, the scheduling information may be in the form of skip pitches. In the case of a sorting device, the required scheduling information may be in the form of a delayed paper feed. These delaying actions may be necessary to allow the capture device time to adjust to a new location for each page identifier.

By automatically adjusting the image capture location for each page within a document or from document to document, the print operator's workflow may be carried out smoothly, with a decrease in disruptions. Set-up time between print jobs may also be reduced, ultimately reducing the operational cost to a print shop.

A further advantage of the systems and methods of this invention is that a page designer for a particular document no longer needs to be concerned with the location of the integrity identifier. Thus, the page design may be varied from page to page for aesthetic or other reasons. This automated process will also increase reliability, in that the need for a print operator to become involved in the lengthy and time-consuming manual process of setting up and adjusting the data integrity system may be reduced, or possibly eliminated. Automatically identifying scanned areas may also improve scanning accuracy and thus add to an increased system-wide reliability in the variable data printing process.

BRIEF DESCRIPTION OF THE DRAWINGS

Various exemplary embodiments of the systems and methods of this invention will be described in detail, with reference to the following figures, wherein.

DETAILED DESCRIPTION OF EXEMPLARY EMBODIMENTS

Figure 1:
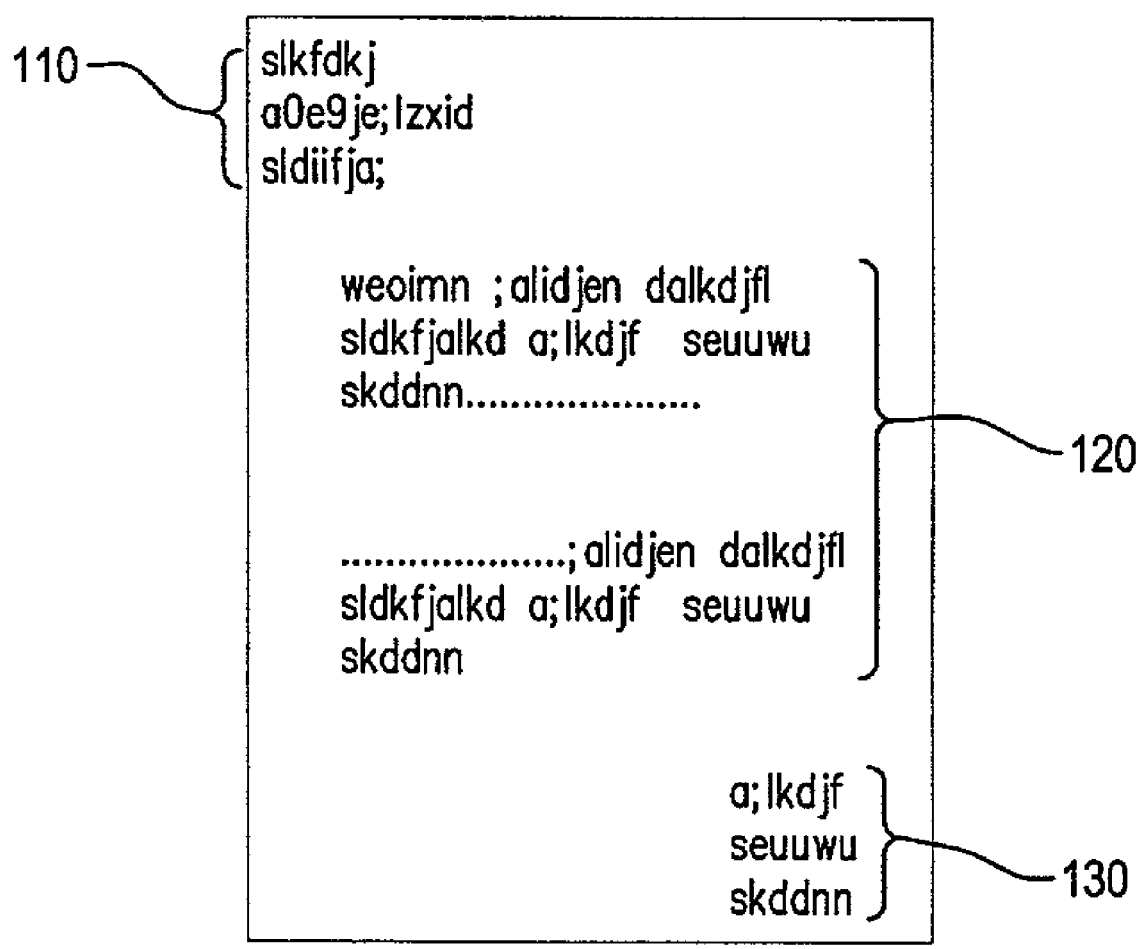
FIG. 1 shows a typical page of a document having a print integrity identifier usable with this invention.

FIG. 1 illustrates a typical page 100 of a document that is used with the systems and methods of this invention. The page 100 has a variable address portion 110 which may vary in size and typically may be located towards the top of the page. Below the variable address portion 110 is a variable text portion 120. A print integrity identity portion 130 is located somewhere on the page 100. This variable text portion 120 may vary according to content and also according to the type of document that is being produced. For example, in the case of financial transactions like credit card bills or bank statements, the variable text portion may vary according to the activity in a particular account and according to each individual customer.

In this case, it may not be practical or desirable to have the print integrity identifier 130 in the same location from document to document, or from page to page. Instead, it may be more desirable to be able to locate the print integrity identifier 130 based on the size and location of the variable text portion 120 and the variable address portion 110. In this way, the space on each page and document may be utilized more efficiently. In the prior art, moving the print integrity identifier 130 on a page-to-page basis required the entire print operation to be delayed while the image capture location of the image capture device was repositioned according to the location of the print integrity identifier 130.

The systems and methods of this invention allow the document author to variably locate the print integrity identifier 130 from page-to-page or document-to-document without concern for any delay in the printing process. In addition, by using the systems and methods of this invention, the print operator need not consult with the author of the document, or even visually examine the document itself, to discern the location of the print integrity identifier.

Figure 2:
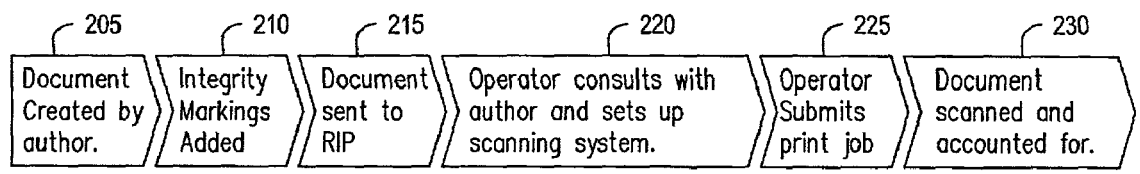
FIG. 2 is a workflow diagram outlining one exemplary operation of a conventional print integrity capture system.

FIG. 2 is a workflow diagram outlining one exemplary operation of a conventional print integrity printing and capture system. As shown in FIG. 2, a document is created by an author in block 205 and integrity markings are added in block 210. As discussed previously, these integrity markings may include print integrity identifiers, such as glyphs or bar codes. These identifiers may be used to determine whether a document has been altered from its original state or to determine when all of the pages of a particular job have been printed in a printing job.

After blocks 205 and 210, the job is sent to a raster image processor (RIP) in block 215. At this point, in block 220, the operator must consult with the author regarding the location, size and type of integrity markings that have been added to the job and set up the scanning system. Once these have been completed, the operator may then submit the print job in block 225 and the document will be scanned and accounted for in block 230.

Figure 3:
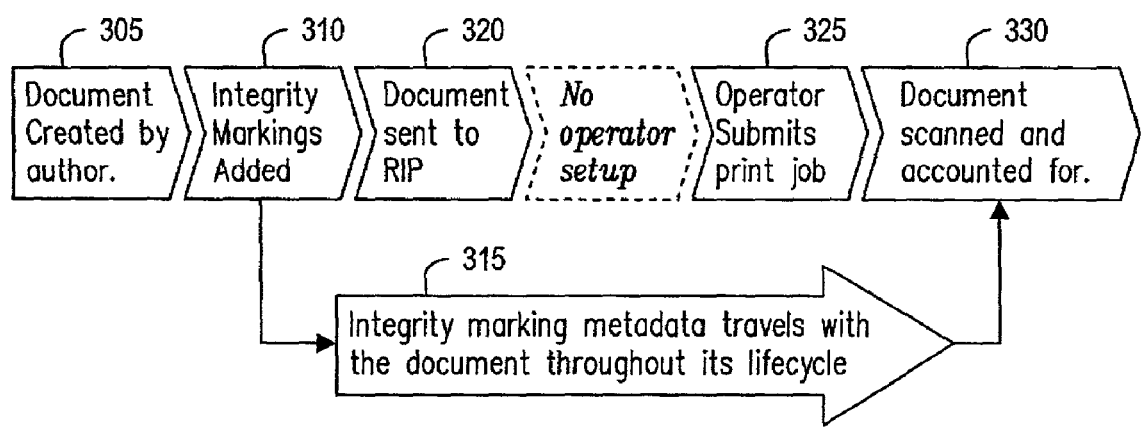
FIG. 3 is a workflow diagram outlining one exemplary embodiment of a method for automatically adjusting a print integrity capture system according to this invention.

FIG. 3 is a workflow diagram outlining one exemplary operation of a print integrity capture system that automatically adjusts for the location of the print integrity identifier on a page-by-page or document-by-document basis according to this invention. Similar to the workflow diagram shown in FIG. 2, as shown in FIG. 3, the job is created by the author in block 305 and integrity markings are added in block 310. However, in contrast to the conventional workflow illustrated in FIG. 2, integrity marking metadata travels with the document or page throughout its life cycle in block 315. Thus, as the document is sent to the RIP in block 320, the location of the print integrity identifier for each document or for each page can be automatically determined and the image capture location of the image capture device is automatically adjusted for each document or for each page. This tends to reduce or obviate the need for each operator to consult with the document author and to reduce or eliminate any operator set-up. In this case, the operator merely submits the print job in block 325. Then the document is automatically scanned and accounted for as in block 330 based on the marking metadata that is associated with that document or that page.

Figure 4:
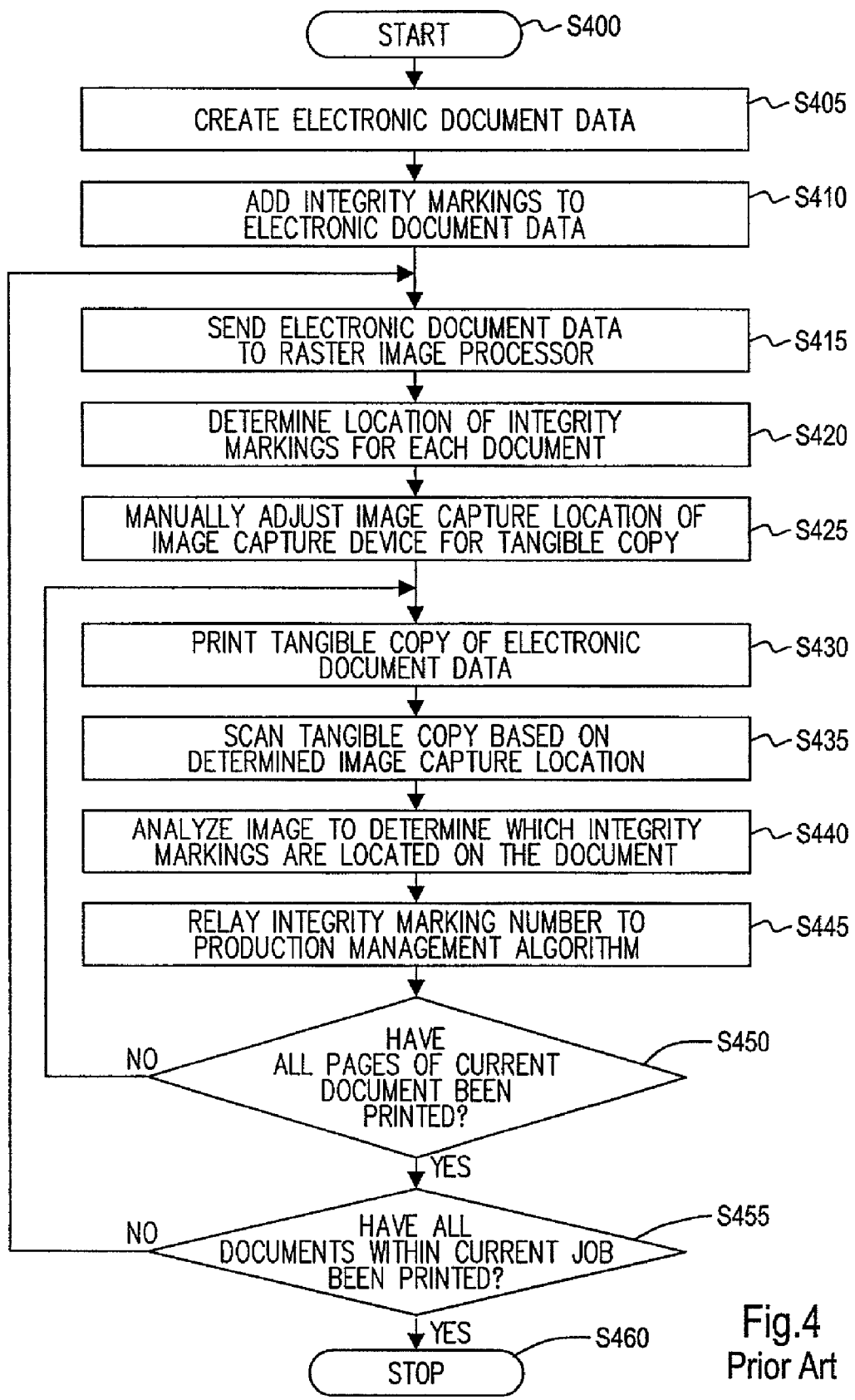
FIG. 4 is a flowchart illustrating a conventional method for capturing print integrity identifiers.

FIG. 4 is a flow chart outlining one exemplary embodiment of the conventional verification process performed on the printed output of variable data jobs. As shown in FIG. 4 the operation begins at step S400 and continues to Step S405 where the electronic document data is created. In step S410, integrity markings are added to the electronic document data. As discussed previously, these integrity markings may consist of print integrity identifiers, such as bar codes or glyphs, used to determine whether the entire job has been printed, or if a particular page of the job has been altered.

In step S415, the document is sent to the raster image processor and in step S420 the operator must determine the location of the integrity markings for each document composing the job. Typically, the operator must consult with the document author, or visually examine a tangible print of the document to determine the location of the print integrity markings. In step S425 the operator manually adjusts the image capture location of the image capture device for each tangible print. In one exemplary embodiment of the conventional method the image capture device may be a camera that must be manually positioned and adequately aligned with the print integrity identifier to ensure the image is properly captured. In another exemplary embodiment of the conventional method the image capture device may be a scanner that must be properly adjusted to ensure that the coding regions for the capture device will capture the full print integrity identifier.

In step S430, a tangible copy of the electronic document is printed and in step S435 the tangible copy is then scanned based on the determined image capture location. As discussed previously, the image may be scanned by a scanner or camera type device. In step S440 the image is then analyzed to determine which integrity markings are located on the document and in step S445 the corresponding integrity marking number is then relayed to a production management algorithm.

Step S450 is a decision block where it is be determined whether all prints within the current job have been printed. If this has not occurred, the operation returns to step S430 and the missing pages or portions of the document must be printed. All the steps following step S430 must be completed until step S450 is reached again and it is determined that all of the pages of the current document have been printed. In step S455 is a decision block where it is determined whether all of the documents for a particular job have been printed. If this has not occurred, the operation returns to step S415 and the electronic document data for the missing documents is sent to the raster image processor. All of the steps following step S415 must be completed until step S455 has again been reached. When all of the documents have been printed the print job is completed and at step S460 the operation ends.

Figure 5:
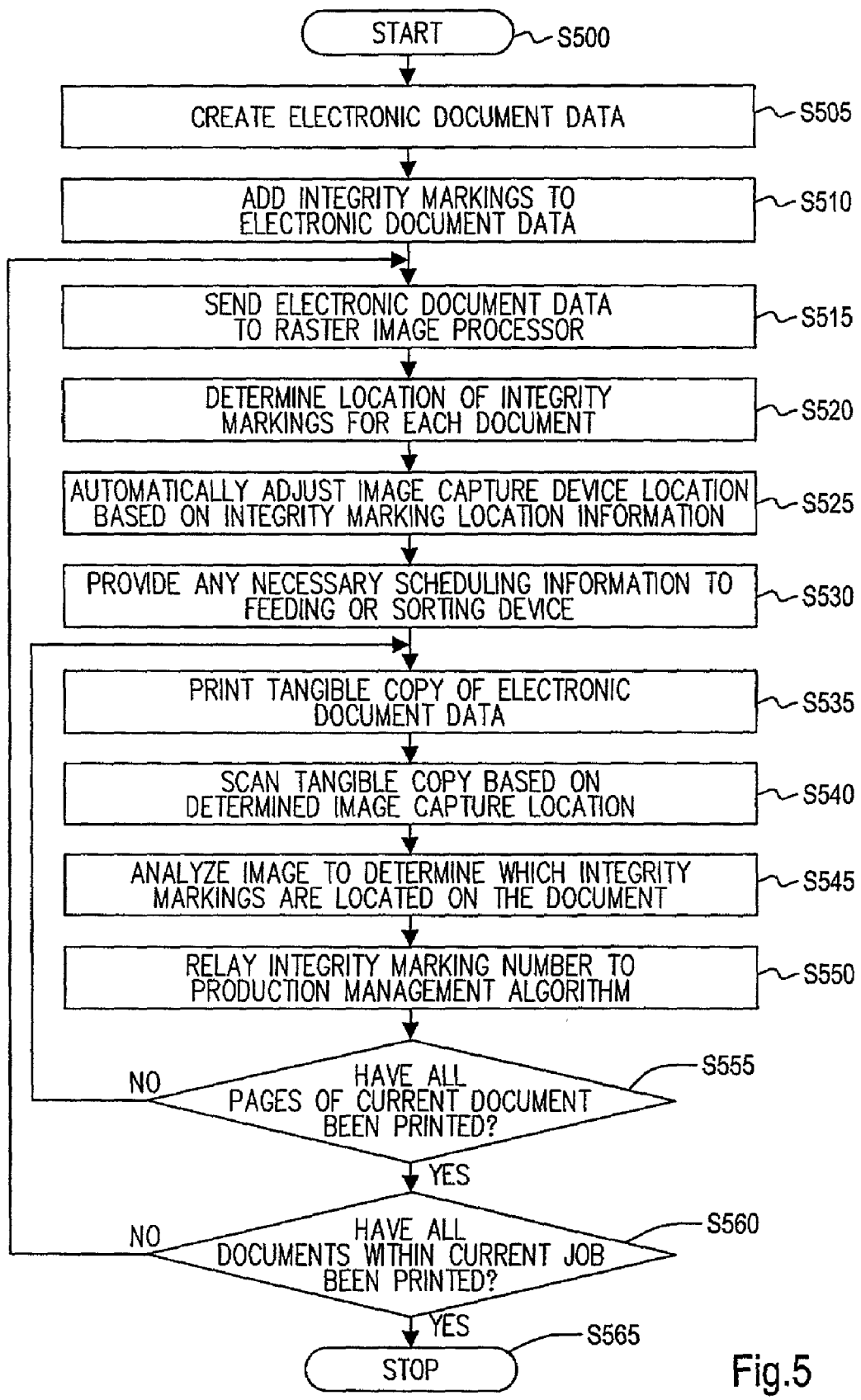
FIG. 5 is a flowchart outlining a first exemplary embodiment of a method for automatically adjusting a print integrity capture system according to this invention where the print integrity identifier does not change location from page to page.

FIG. 5 is a flow chart outlining one exemplary embodiment of the method of this invention. The operation, as illustrated in FIG. 5, shows a method of this invention for use with documents that have print integrity markings located in the same location on each individual page of a document. At step S500 the operation begins. Step S505, creating electronic document data, step S510, adding integrity markings to electronic document data and step S515, sending electronic document data to a raster image processor must all be performed, as in the conventional method.

In step S520 the location of the integrity markings for each document is determined. In this step the raster image processor may determine the location of the print integrity identifier within the PDL (eg, post script) stream of the end identifier font. In another exemplary embodiment the authoring tool may generate the location information for each individual page or document and then attach the information to a supplementary record field which may then be used to determine the location of the integrity markings for each document. Additionally, the glyph generator, within the printing system, may place the location of the print integrity identifier in an accessible memory location at the time the integrity markings are added to the electronic document data.

The location information may consist of various metadata elements describing the variable data identifier type, name, value and importantly, the X and Y coordinate values placing the object and describing the object's geographic boundary. A typical marking might be rectangular in shape and require a rectangular area slightly larger than the marking to be identified for the scanning device that will scan and decode the marking. Based on the location information of the print integrity identifier, the image capture device location may be automatically adjusted from document-to-document. In one exemplary embodiment of the method of this invention, the identifier location information is retrieved by a software application which then automatically adjusts the image capture device's location of interest. This may be done by mechanically moving cameras through the use of servo motors or other such similar devices, or in the case of a scanner, adjusting the decoding regions of the capture device.

In step S525 the image capture device location is automatically adjusted based on the integrity marking location information and in step S530 any necessary scheduling information is provided to a paper feeding or sorting device. This information may be necessary to allow to the image capture device sufficient time to be relocated between documents. In step S535, a tangible print of the electronic document data is printed and in step S540 a tangible print is scanned based on the determined image capture location. In step S545 the image is analyzed to determine which integrity markings are located on the document and in step S550 the integrity marking number for each marking is relayed to a production management algorithm.

S555 is a decision block where it is determined whether all prints of the current job have been printed. If this has not occurred, the operation returns to step S535 where a tangible copy of the electronic document data is printed. All of the steps following S535 must be performed until step S555 has again been reached. Once it has been determined that all copies of the current document have been printed the operation may proceed to the next step.

Step S560 is a decision block where it is determined whether all of the documents for a particular print job have been printed. If this has not occurred, the operation returns to step S515 where the remaining electronic document data is sent to the raster image processor. All of the steps following step S515 must be performed until step S560 has again been reached. When all of the documents have been printed the print job is completed and at step S565 the operation ends.

Figure 6:
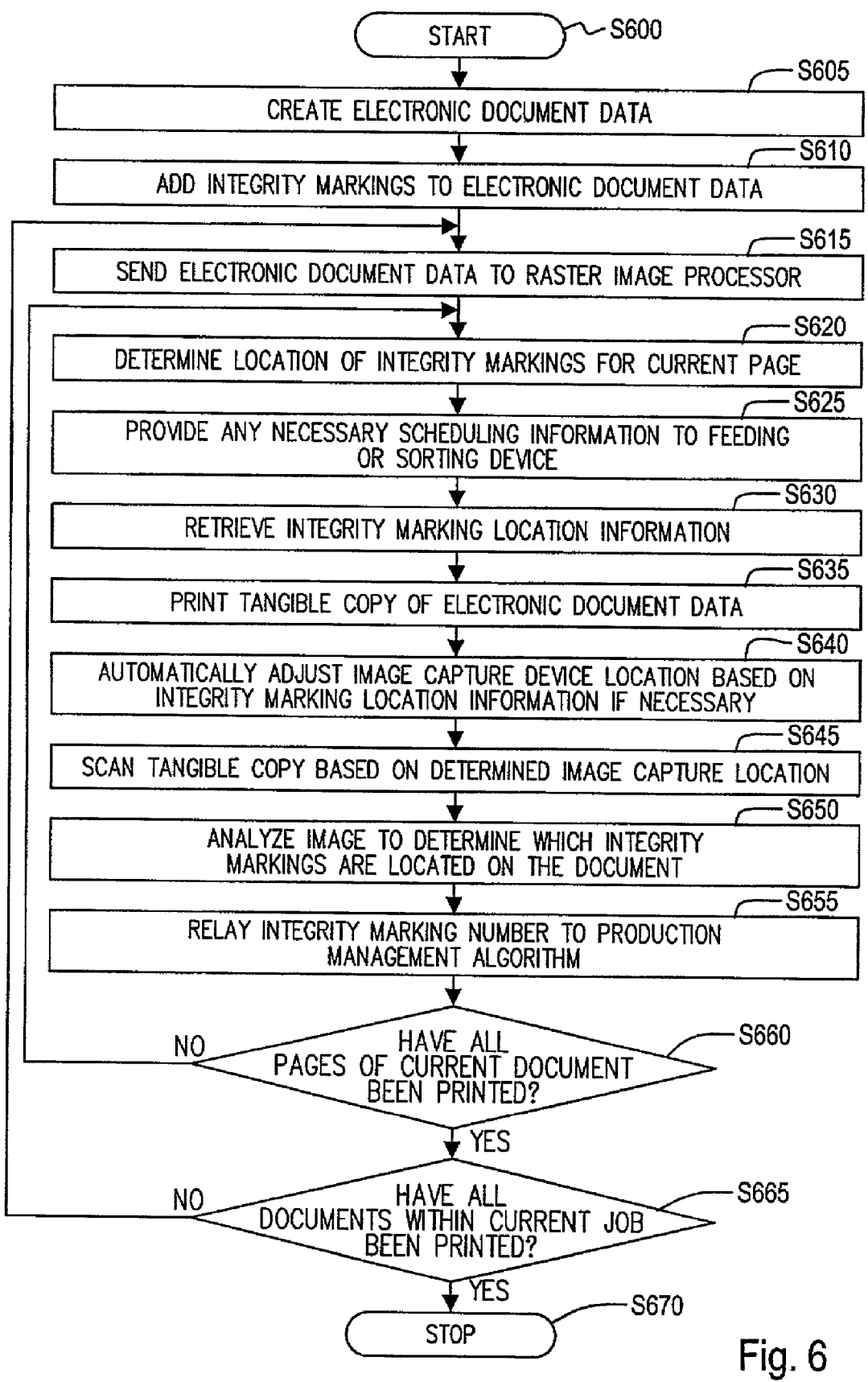
FIG. 6 is a flowchart outlining a second exemplary embodiment of a method for automatically adjusting a print integrity capture system according to this invention where the print integrity identifier changes location from page to page.

FIG. 6 is a flow chart outlining one exemplary embodiment of the method of this invention where the integrity markings for a particular document may vary from page-to-page, in addition to varying from document-to-document, as illustrated in FIG. 5. In step S600 the operation begins. In step S605 electronic document data is created, in step S610 integrity markings are added to electronic document data and in step S615 the electronic document data is sent to a raster image processor, as in the conventional method.

In step S620 the location of the integrity markings for the current page is determined. As discussed previously, this location information may be determined by the raster image processor, by the glyph generator placing location information in an accessible memory location and by the authoring tool generating the location information and attaching it to a supplementary record field.

In step S625 any necessary scheduling information is sent to the feeding or sorting device. In the case of a print station, this information may be skip pitches or for sorting devices the information may be in the form of a delayed paper feed. These delaying actions allow the capture device time to adjust to a new location for each page identifier. In step S630 the integrity marking location information is retrieved. Because the integrity marking location may vary from page-to-page in the document, this information must be individually retrieved for each page to ensure that the image capture device is properly located for each individual page.

In step S635 a tangible print of the electronic document data is printed and in step S640 the image capture device location is automatically adjusted based on the integrity marking location, if necessary. As discussed previously, the image capture device may be a camera, scanner or other such similar device. In step S645 the tangible copy is then scanned based on the determined image capture location.

In step S650 the image is then analyzed to determine which integrity marking is located on the document and in step S655 the corresponding integrity marking number is relayed to a production management algorithm.

Step S660 is a decision block, where it is determined whether all prints of the current job have been printed. If this has not occurred, The operation returns to step S620, where the location of the integrity markings for the current page are determined. All of the steps following S620 must be performed until step S660 has again been reached. When it is determined in step S660 that all of the documents have been printed, the operation moves on to the next step.

Step S665 is a decision block where it is determined whether all of the documents for a particular print job have been printed. If this has not occurred, the operation returns to step S615 where the electronic document data is sent to the raster image processor. All of the steps following S615 must be completed until step S665 has again been reached. When it is determined that all of the documents have been printed the print job is complete and at step S670 the operation ends.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the scope and spirit of the invention.

What is claimed is:

1. A method for positioning a print integrity image capture device, comprising:
   providing electronic document data having print integrity information to an image processor;
   identifying a location of integrity markings to be provided on a tangible copy of at least a page generated from the electronic document data;
   printing the tangible copy based on the electronic document data;
   automatically adjusting an image capture device location based on the identified integrity markings' location for the tangible copy; and
   capturing an image of at least a portion of a tangible copy based on the identified integrity markings' location.

2. The method of claim 1, further comprising providing necessary scheduling information to at least one of a feeding device and a sorting device.

3. The method of claim 2, wherein the scheduling information is in the form of skip pitches for a printing station.

4. The method of claim 2, wherein the scheduling information is in the form of a delayed paper feed for a sorting device.

5. The method of claim 1, further comprising analyzing an image to determine which integrity marking is located on the tangible copy of electronic document data.

6. The method of claim 1, further comprising relaying an integrity marking number to a production management system.

7. The method of claim 1, further comprising determining whether all tangible copies of electronic document data have been printed based on the print integrity information.

8. The method of claim 1, further comprising determining whether all documents have been printed based on the print integrity information.

9. The method of claim 1, wherein the image capture device is a camera and automatically adjusting the image capture device comprises mechanically moving the camera relative to the tangible copy based on the identified integrity markings' location.

10. The method of claim 1, wherein the image capture device is a scanner and automatically adjusting the image capture device comprises adjusting the decoding region of the scanner relative to the tangible copy based on the identified integrity markings' location.

11. The method of claim 1, wherein determining the location of the integrity markings for each document comprises an operation performed by a raster image processor.

12. The method of claim 1, wherein determining the location of the integrity markings for each document comprises an operation performed by a print system glyph generator.

13. The method of claim 1, wherein determining the location of the integrity markings for each document is comprises an operation performed by a page authoring tool.

14. The method of claim 1, wherein integrity marking location information comprises metadata elements that describe at least one of a variable data identifier type, a name, a value and location coordinate values.

15. The method of claim 1, wherein the integrity markings are glyphs.

16. The method of claim 1, wherein the integrity markings are bar codes.

17. The method of claim 1, wherein the integrity markings are rectangular in shape.

18. A method for positioning a print integrity image capture device, comprising:
   providing electronic document data having print integrity information to an image processor;
   identifying a location of integrity markings to be provided on a tangible copy of at least a page generated from the electronic document data;
   retrieving integrity markings' location information;
   printing the tangible copy based on the electronic document data;
   automatically adjusting an image capture device location based on the identified integrity markings' location for the tangible copy; and
   capturing an image of at least a portion of a tangible copy based on the identified integrity markings' location.

19. The method of claim 18, further comprising providing necessary scheduling information to at least one of a feeding device and a sorting device.

20. The method of claim 19, wherein the scheduling information is in the form of skip pitches for a printing station.

21. The method of claim 19, wherein the scheduling information is in the form of a delayed paper feed for a sorting device.

22. The method of claim 18, further comprising analyzing an image to determine which integrity marking is located on the tangible copy of electronic document data.

23. The method of claim 18, further comprising relaying an integrity marking number to a production management system.

24. The method of claim 18, further comprising determining whether all tangible copies of electronic document data have been printed based on the print integrity information.

25. The method of claim 18, further comprising determining whether all documents have been printed based on the print integrity information.

26. The method of claim 18, wherein the image capture device is a camera and automatically adjusting the image capture device comprises mechanically moving the camera relative to the tangible copy based on the identified integrity markings' location.

27. The method of claim 18, wherein the image capture device is a scanner and automatically adjusting the image capture device comprises adjusting the decoding region of the scanner relative to the tangible copy based on the identified integrity markings' location.

28. The method of claim 18, wherein determining the location of the integrity markings for each document comprises an operation performed by a raster image processor.

29. The method of claim 18, wherein determining the location of the integrity markings for each document comprises an operation performed by a print system glyph generator.

30. The method of claim 18, wherein determining the location of the integrity markings for each document is comprises an operation performed by a page authoring tool.

31. The method of claim 18, wherein integrity marking location information comprises metadata elements that describe at least one of a variable data identifier type, a name, a value and location coordinate values.

32. The method of claim 18, wherein the integrity markings are glyphs.

33. The method of claim 18, wherein the integrity markings are bar codes.

34. The method of claim 18, wherein the integrity markings are rectangular in shape.

* * * * *